(12) United States Patent
Wu et al.

(10) Patent No.: US 12,465,450 B2
(45) Date of Patent: Nov. 11, 2025

(54) AUXILIARY SUPPORT APPARATUS

(71) Applicant: ROBGENIX MEDICAL PTE. LTD., Singapore (SG)

(72) Inventors: Gang Wu, Shanghai (CN); Cunwang Ge, Shanghai (CN); Hao Chen, Shanghai (CN); Xueting Wei, Shanghai (CN)

(73) Assignee: ROBGENIX MEDICAL PTE. LTD., Singapore (SG)

( * ) Notice: Subject to any disclaimer, the term of this patent is extended or adjusted under 35 U.S.C. 154(b) by 0 days.

(21) Appl. No.: 19/182,369

(22) Filed: Apr. 17, 2025

(65) Prior Publication Data
US 2025/0241722 A1 Jul. 31, 2025

Related U.S. Application Data

(63) Continuation of application No. PCT/CN2024/140583, filed on Dec. 19, 2024.

(30) Foreign Application Priority Data

Dec. 20, 2023 (CN) .......................... 202311772342.0

(51) Int. Cl.
  *A61B 50/20* (2016.01)
  *B25J 9/10* (2006.01)
  *B25J 19/00* (2006.01)

(52) U.S. Cl.
  CPC .............. *A61B 50/20* (2016.02); *B25J 9/102* (2013.01); *B25J 19/0004* (2013.01)

(58) Field of Classification Search
  CPC .............. A61B 50/20; A61B 17/3421; A61B 2017/00477; A61B 2034/302; A61B 34/37; B25J 9/102; B25J 19/0004
  See application file for complete search history.

(56) References Cited

U.S. PATENT DOCUMENTS

2020/0268460 A1* 8/2020 Tse .......................... A61B 34/30
2023/0035946 A1  2/2023 Kapadia

FOREIGN PATENT DOCUMENTS

CN      107468293 A    12/2017
CN      115568957 A     1/2023
(Continued)

OTHER PUBLICATIONS

International Search Report and Written Opinion of the ISA for PCT/CN2024/140583, mailed Apr. 7, 2025, 15 pages.

*Primary Examiner* — Scott Luan
(74) *Attorney, Agent, or Firm* — Nixon & Vanderhye P.C.

(57) ABSTRACT

The present disclosure discloses an auxiliary support apparatus, relating to the field of medical device technology. The apparatus comprises a base, a support arm and a pivot mechanism, the support arm being vertically movably provided on the base and pivotable relative to the base, where the support arm comprises at least two arm rods pivotably connected in an end-to-end stacked configuration and has a distal end opposite the base for detachable connection to a surgical instrument; the pivot mechanism comprising a brake button, pivot shafts and electromagnetic brakes, where the pivot shafts are configured for respective connections between one arm rod and the base and between adjacent arm rods, and the electromagnetic brakes configured for the pivot shafts respectively are electrically connected to the brake button. The apparatus can achieve high flexibility in adjustment of the surgical instrument, and ensure its positional stability, guaranteeing the smooth progression of surgical procedures.

18 Claims, 8 Drawing Sheets

(56) References Cited

FOREIGN PATENT DOCUMENTS

| CN | 115813566 A | 3/2023 |
|---|---|---|
| CN | 219070628 U | 5/2023 |
| CN | 117547362 A | 2/2024 |
| CN | 221636093 U | 9/2024 |
| JP | 6562174 B1 | 8/2019 |
| WO | 2010/068005 A2 | 6/2010 |

\* cited by examiner

AUXILIARY SUPPORT APPARATUS

CROSS-REFERENCE TO RELATED APPLICATIONS

This application is a continuation of International Application No. PCT/CN2024/140583, filed on Dec. 19, 2024, which claims the priority to Chinese Patent Application No. 202311772342.0 filed on Dec. 20, 2023, and entitled "AUXILIARY SUPPORT APPARATUS", the entire disclosure of which is incorporated by reference herein.

TECHNICAL FIELD

The present disclosure relates to the field of medical device technology, and in particular to an auxiliary support apparatus.

BACKGROUND

Conventional surgical instruments require manual support by the surgeon during use. Currently, auxiliary mechanical support arms mounted adjacent to surgical beds are employed to replace manual support for the surgical instruments, providing more precise and sustained support, thereby freeing the surgeon's hands while improving the operational reliability of surgical instrument fixation.

Existing auxiliary mechanical support arms adjust the operational position of the surgical instruments adjacent to the surgical beds relative to the patients by modifying their range of motion, enabling the surgical instruments to be adapted to diverse surgical procedures and patient positioning across variable anatomical profiles. Although the existing auxiliary mechanical support arms offer high flexibility in adjustment, their poor stability during adjustment necessitates repeated corrections, which delays surgical workflows.

SUMMARY

The objective of the present disclosure is to provide an auxiliary support apparatus, which can not only ensure flexibility in position adjustment of surgical instruments, but also ensure the positional stability during adjustment of surgical instruments, thereby guaranteeing the smooth progression of surgical procedures.

To achieve this objective, the present disclosure adopts the following technical solutions.

An auxiliary support apparatus is provided, which includes:
a base;
a support arm vertically movably provided on the base and pivotable relative to the base, the support arm including at least two arm rods pivotably connected in an end-to-end stacked configuration, and having a distal end opposite the base for detachable connection to a surgical instrument; and
the pivot mechanism including a brake button, pivot shafts and electromagnetic brakes, the pivot shafts being configured for respective connections between one of at least two arm rods and the base and between adjacent arm rods, and the electromagnetic brakes being provided to correspond to the pivot shafts respectively and electrically connected to the brake button.

As an optional solution for the auxiliary support apparatus, the auxiliary support apparatus further includes an installation mechanism provided at the distal end of the support arm and pivotably connected to the support arm.

As an optional solution for the auxiliary support apparatus, the installation mechanism includes a rotation assembly and an installation member, where the rotation assembly is provided at the distal end of the support arm and connected to the installation member.

As an optional solution for the auxiliary support apparatus, the rotation assembly includes a worm gear and a worm, where the installation member is centrally connected to the worm gear, and the worm gear is engaged with the worm for transmission.

As an optional solution for the auxiliary support apparatus, the installation mechanism further includes an installation housing fixed to the distal end of the support arm, where the worm gear is disposed within the installation housing, and the worm has one end engaged with the worm gear for transmission and the other end extending outwardly from the installation housing, and is rotatably connected to the installation housing.

As an optional solution for the auxiliary support apparatus, a rotary handle is provided at the other end of the worm that extends outwardly.

As an optional solution for the auxiliary support apparatus, the base is provided with a fixation assembly including a first fixation member and a second fixation member, the first fixation member being configured to mate with a lateral side of a surgical bed and height-adjustable relative to the base, and the second fixation member being configured to mate with a bed surface of the surgical bed.

As an optional solution for the auxiliary support apparatus, the base is provided with a fixation assembly including an installation groove and a support seat, the installation groove being provided below the support seat and configured to mate with a steel rail on one side of a surgical bed, and the support seat being configured to be supported on a bed surface of the surgical bed, where the installation groove is height-adjustable relative to the base.

As an optional solution for the auxiliary support apparatus, the base is provided with a fixation assembly including an installation bracket and a fixation slot, the installation bracket being configured to span across a bed surface of a surgical bed and be laterally engaged with steel rails on both sides of the surgical bed and comprising on one side proximate to the base an installation lug for mating with the fixation slot, and the fixation slot being height-adjustable relative to the base.

As an optional solution for the auxiliary support apparatus, a transport coupling interface is provided at a bottom of the base and is L-shaped.

Beneficial effects of the present disclosure are as follows:

According to the auxiliary support apparatus provided by the present disclosure, a support arm is vertically movably provided on a base and pivotable relative to the base, where the support arm includes at least two arm rods pivotably connected in an end-to-end configuration, and has a distal end opposite the base detachably connected to a surgical instrument. The support arm vertically movable relative to the base enables adjustment of the surgical instrument in height relative to a surgical bed. The arm rods pivotably connected in an end-to-end configuration enlarges the movement range of the surgical instrument relative to the surgical bed, thus enable accommodation of diverse surgical procedures and patients with variable anatomical profiles with high flexibility in adjustment. One corresponding electromagnetic brake is configured for each pivot shaft and electrically connected to a brake button. During positional adjustment of the surgical instrument, pressing the brake button disengages the electromagnetic brake from the pivot shafts, allowing each arm rod to pivot under control to adjust the position of the surgical instrument. Once the surgical instrument is adjusted in place, pressing the brake button again reactivates the electromagnetic brake to immobilize the pivot shafts, securing the arm rods in place, thereby ensuring the positional stability of the surgical instrument. The auxiliary support apparatus for supporting the surgical instrument can not only achieve high flexibility in adjustment of the surgical instrument, but also ensure the positional stability of the surgical instrument, thereby guaranteeing the smooth progression of surgical procedures.

Figure 1:
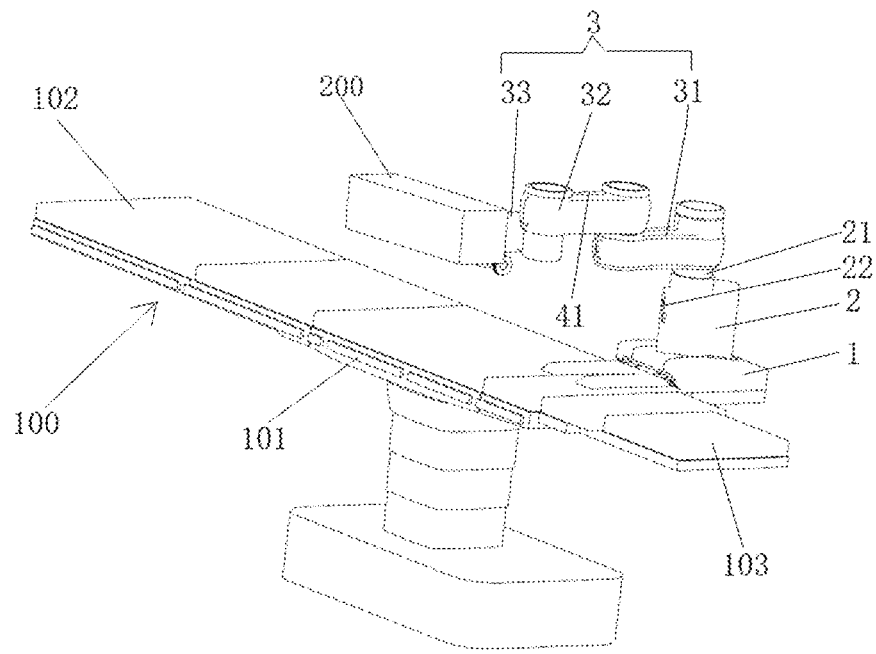
FIG. 1 is a schematic diagram of the auxiliary support apparatus according to an embodiment of the present disclosure, connected to the surgical bed, where the surgical instrument is in a lower position, a horizontal attitude and proximate to the head end of the surgical bed.

In the drawings:
100: Surgical bed; 101: Steel rail; 102: Head end; 103: Tail end;
200: Surgical instrument;
300: Transfer trolley; 301: Connector;
1: Base; 11: Fixation assembly; 111: Installation groove; 112: Support seat; 113: Installation bracket; 1131: Clamping slot; 1132: Installation lug; 114: Fixation slot; 115: Fastening screw; 116: Height adjustment stud; 117: Limiting nut; 118: First locking screw; 119: Second locking screw; 12: Transport coupling interface;
2: Support sleeve; 21: Lifting drive; 22: Lifting button;
3: Support arm; 31: First arm rod; 32: Second arm rod; 33: Third arm rod;
4: Pivot mechanism; 41: Brake button; 42: Pivot shaft; 43: Electromagnetic brake;
5: Installation mechanism; 51: Installation housing; 52: Worm gear; 53: Worm; 54: Installation member; 55: Rotary handle.

DETAILED DESCRIPTION

The embodiments of the present disclosure are described in detail below, and examples of the embodiments are shown in the accompanying drawings, in which the same or similar reference numerals throughout represent the same or similar elements or elements with the same or similar functions. The embodiments described below with reference to the accompanying drawings are exemplary and are intended to be used to explain the present disclosure, and cannot be understood as limiting the present disclosure.

In the description of the present disclosure, it should be noted that the terms "center", "upper", "lower", "left", "right", "vertical", "horizontal", "inside", "outside" indicate the relative positions or orientations based on those shown in the drawings, for the purpose of concise description of the present disclosure only, rather than indicating or implying that the device or element referred to must have a particular orientation, or be constructed and operated in a particular orientation. Furthermore, the terms such as "first" and "second" are for a distinguishing purpose only, and should not be construed as indicating or implying relative importance. Among them, the terms "first position" and "second position" are two different positions.

Unless otherwise explicitly specified and defined, the terms "install", "connect", "couple", and "fix" should be comprehended in a broad sense, and may refer to, for example, fixed or detachable connections, or integrated connections; mechanical or electrical connections; direct connections or indirect connections through intermediate mediums, or communication between interiors of two elements or interaction between two elements. For a person of ordinary skill in the art, the specific meanings of these terms in the present disclosure can be understood based on specific circumstances.

Unless otherwise explicitly specified and defined, when a first feature is described as being "above" or "below" a second feature, it includes both direct contact between the first and second features and indirect contact through an additional feature therebetween. Moreover, when a first feature is described as being "above", "over" and "on" a second feature, it includes both the case where the first feature is directly above the second feature and the case where the first feature is obliquely above the second feature, or simply indicates that the first feature is at a higher level than the second feature. When the first feature is described as "below", "under" and "beneath" the second feature, it includes both the case where the first feature is directly below the second feature and the case where the first feature is obliquely below the second feature, or simply indicates that the first feature is at a lower level than the second feature.

The technical solution of the present disclosure is further explained below in conjunction with the accompanying drawings and through specific implementations.

Figure 2:
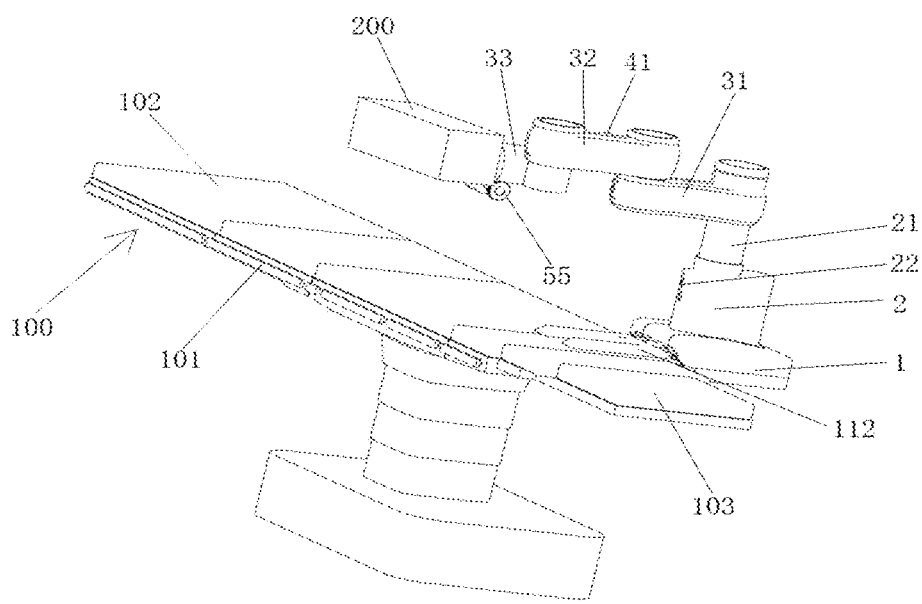
FIG. 2 is a schematic diagram of the auxiliary support apparatus according to an embodiment of the present disclosure, connected to the surgical bed, where the surgical instrument is in a higher position, a horizontal attitude and proximate to the head end of the surgical bed.

As shown in FIG. 1 and FIG. 2, this embodiment provides an auxiliary support apparatus including a base 1 and a support arm 3, where the base 1 is connected to the surgical bed 100, the support arm 3 is vertically movably provided on the base 1, and is pivotable relative to the base 1. The support arm 3 includes at least two arm rods pivotably connected in an end-to-end stacked configuration. The support arm 3 has a distal end opposite the base 1 for detachable connection to the surgical instrument 200 via bolt connection or snap-fit connection. The support arm 3 vertically movable relative to the base 1 enables adjustment of the surgical instrument 200 in height relative to the surgical bed 100. The arm rods pivotably connected in the end-to-end configuration enlarges the movement range of the surgical instrument 200 relative to the surgical bed 100, thus enable accommodation of diverse surgical procedures and patients with variable anatomical profiles with high flexibility in adjustment.

The base 1 is provided with a support sleeve 2, and a lifting drive 21 is provided in the support sleeve 2. The driving end of the lifting drive 21 is connected to the arm rod of the support arm 3 near the end of the base 1, which is used to drive the support arm 3 to rise or fall to change the height of the surgical instrument 200 relative to the surgical bed 100. FIG. 1 shows a schematic diagram of the state where the lifting drive 21 drives the support arm 3 to be in a lower position, and FIG. 2 shows a schematic diagram of the state where the lifting drive 21 drives the support arm 3 to be in a higher position. The outer wall of the support sleeve 2 is provided with a lifting button 22 electrically connected to the lifting drive 21 in the support sleeve 2, and the lifting and lowering of the support arm 3 may be controlled by the lifting button 22. The lifting drive 21 can be a linear drive such as an electric push rod or a linear motor, and the lifting button 22 is electrically connected to the electric push rod or the linear motor.

Figure 3:
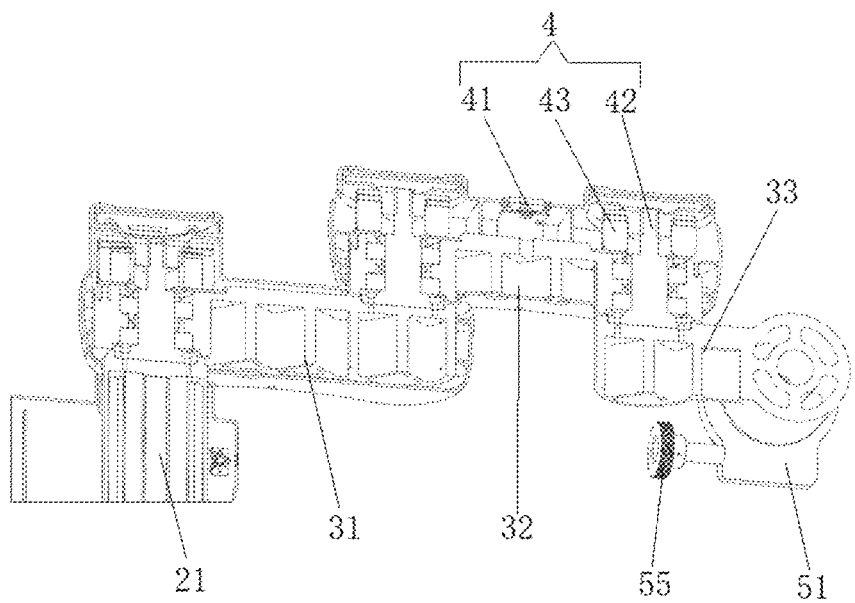
FIG. 3 is a partial cross-sectional view of the auxiliary support apparatus according to an embodiment of the present disclosure.

Specifically, as shown in FIG. 3, the auxiliary support apparatus further includes a pivot mechanism 4 including a brake button 41, pivot shafts 42 and electromagnetic brakes 43. The pivot shafts 42 are configured for respective connections between one arm rod and the base 1 and between the adjacent arms. The electromagnetic brakes 43 are provided to correspond to the pivot shafts (42) respectively and electrically connected to the brake button 41 configured to control the electromagnetic brakes 43 to brake the pivot shafts 42 or release the brake. The electromagnetic brakes 43 are controlled by the brake button 41 to brake the pivot shafts 42, that is, during positional adjustment of the surgical instrument 200, pressing the brake button 41 disengages the electromagnetic brakes 43 from the pivot shafts 42, allowing each arm rod to pivot under control to adjust the position of the surgical instrument 200. Once the desired positional adjustment of the surgical instrument 200 is done, pressing the brake button 41 again reactivates the electromagnetic brakes 43 to immobilize the pivot shafts 42, securing the arm rods in place, thereby ensuring the positional stability of the surgical instrument 200.

Exemplarily, the support arm 3 includes three arm rods, namely a first arm rod 31, a second arm rod 32 and a third arm rod 33. Correspondingly, three pivot shafts 42 and electromagnetic brakes 43 are also provided. The pivot shafts 42 include a first pivot shaft, a second pivot shaft and a third pivot shaft. The electromagnetic brakes 43 includes a first electromagnetic brake, a second electromagnetic brake and a third electromagnetic brake. The first pivot shaft is fixed to the driving end of the lifting drive member 21. One end of the first arm rod 31 and both ends of the second arm rod 32 are provided with connecting holes. The first pivot shaft is provided in the connection hole of the first arm rod 31, the first electromagnetic brake is arranged between the first pivot shaft and the connection hole of the first arm rod 31, the second pivot shaft is fixed to the other end of the first arm rod 31 and is arranged in the connection hole of one end of the second arm rod 32, the second electromagnetic brake is arranged between the second pivot shaft and the connection hole of one end of the second arm rod 32, the third pivot shaft is fixed to one end of the third arm rod 33 and is arranged in the connection hole of the other end of the second arm rod 32, and the third electromagnetic brake is arranged between the connection hole of the third pivot shaft and the other end of the second arm rod 32. Three brake buttons 41 may be provided, or one brake button 41 may be provided. When three brake buttons 41 are provided, one brake button 41 is connected to one electromagnetic brake 43, and the three electromagnetic brakes 43 enable independent braking of the pivot shafts 42 connected to them respectively. When one brake button 41 is provided, the three electromagnetic brakes 43 are all connected to one brake button 41, and one brake button 41 simultaneously controls the three electromagnetic brakes 43 to brake the pivot shafts 42 connected to them respectively.

Specifically, the electromagnetic brake 43 includes a traction magnet and a shoe brake. The traction magnet is arranged on the inner wall of the connection hole, and the shoe brake is arranged on the pivot shaft 42. When the brake button 41 is pressed, the traction magnet is energized to retract the shoe brake, causing it to disengage from the pivot shaft 42, which allows the arm rod to pivot relative to the pivot shaft 42, thereby adjusting the pivot angle of the arm rod, and in turn adjusting the position of the surgical instrument 200. Upon pressing again of the brake button 41, the traction magnet is de-energized to release the shoe brake, causing it to clamp onto the pivot shaft 42, which immobilizes the arm rod relative to the pivot shaft 42, thereby ensuring that the position of the surgical instrument 200 remains unchanged, thus ensuring the positional stability of the surgical instrument 200.

Further, the pivot shaft 42 is a damping pivot shaft, and pivotable connection of each arm rod is implemented via the damping pivot shaft, which can ensure that the arm can only be repositioned by a certain amount of drag force required for a clear position adjustment, avoiding the arm rod from pivoting arbitrarily and unexpectedly, and further ensuring the stability of the position adjustment of the surgical instrument 200.

Figure 4:
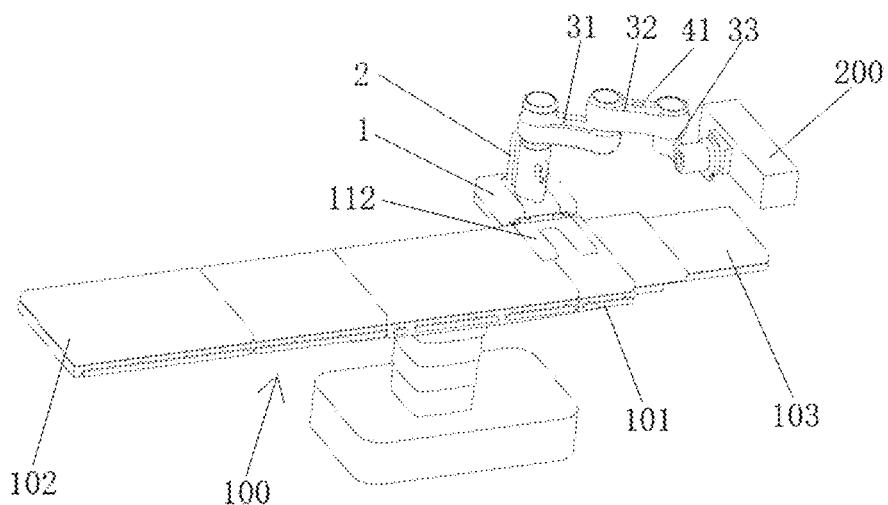
FIG. 4 is a schematic diagram of the auxiliary support apparatus according to an embodiment of the present disclosure, connected to the surgical bed, where the surgical instrument is in a lower position, horizontal attitude and proximate to the tail end of the surgical bed.
Figure 5:
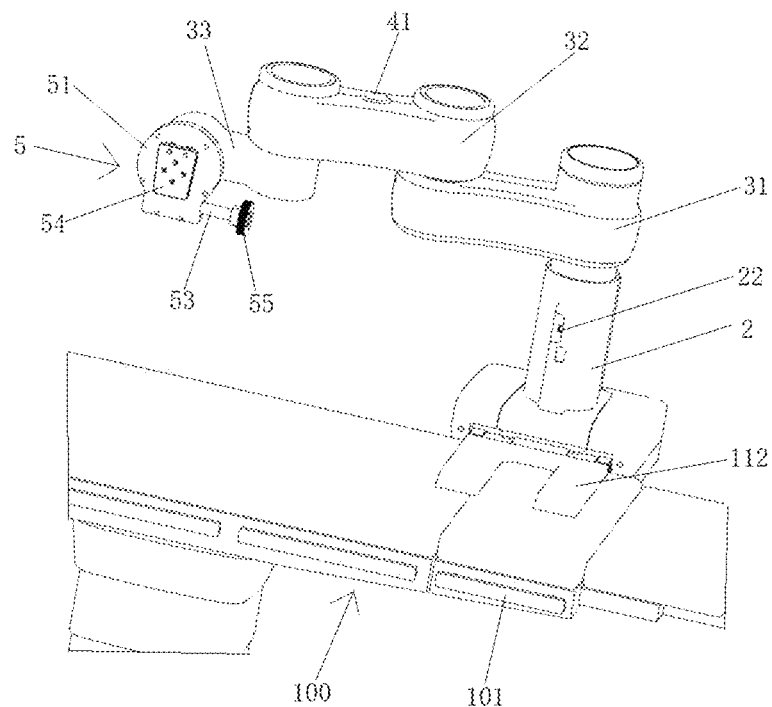
FIG. 5 is a schematic diagram of the auxiliary support apparatus according to an embodiment of the present disclosure, connected to the surgical bed, where the installation member is not rotated without the surgical instrument installed.
Figure 6:
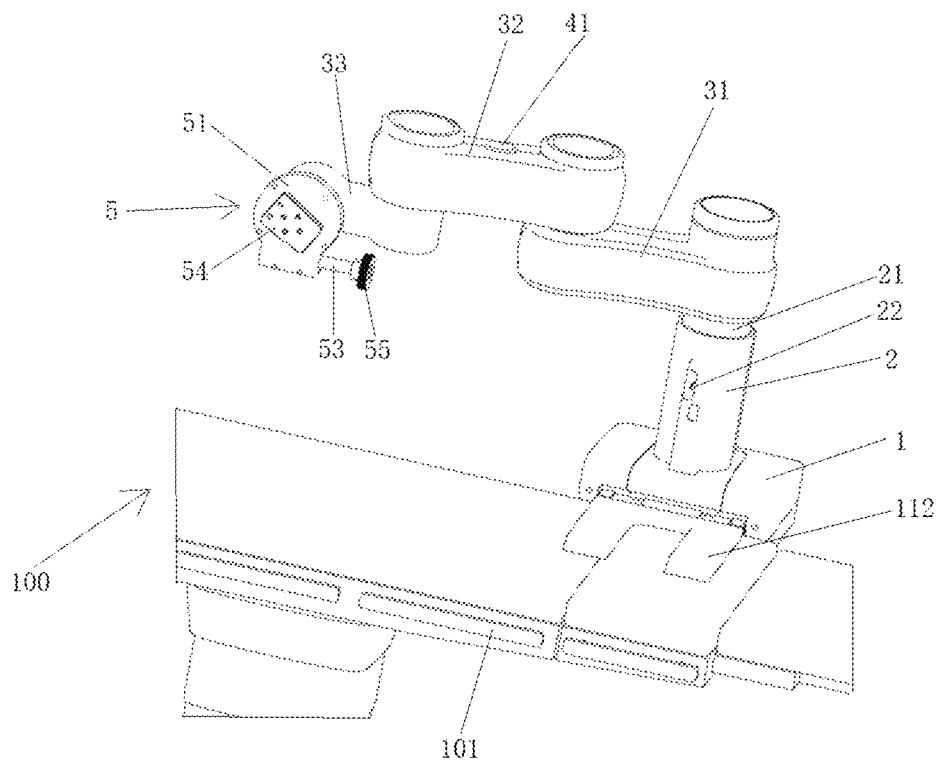
FIG. 6 is a schematic diagram of the auxiliary support apparatus according to an embodiment of the present disclosure, connected to the surgical bed, where the installation member is rotated without the surgical instrument installed.
Figure 7:
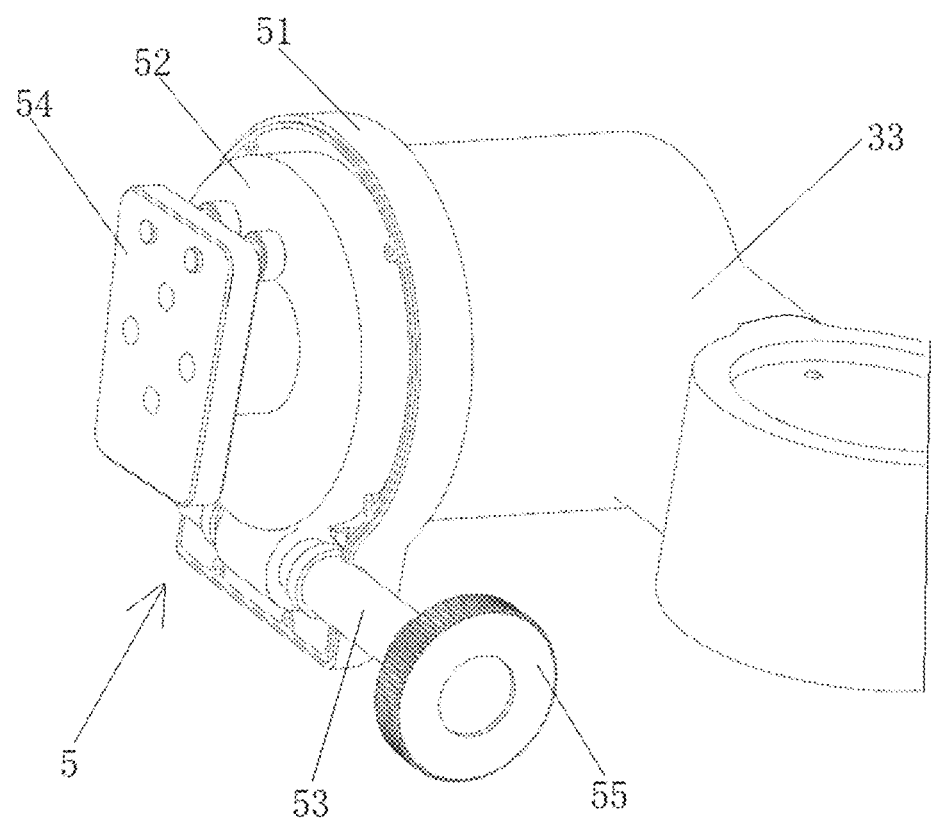
FIG. 7 is a schematic structural diagram of the installation mechanism of the auxiliary support apparatus according to an embodiment of the present disclosure, where the installation housing is partially hidden.
Figure 8:
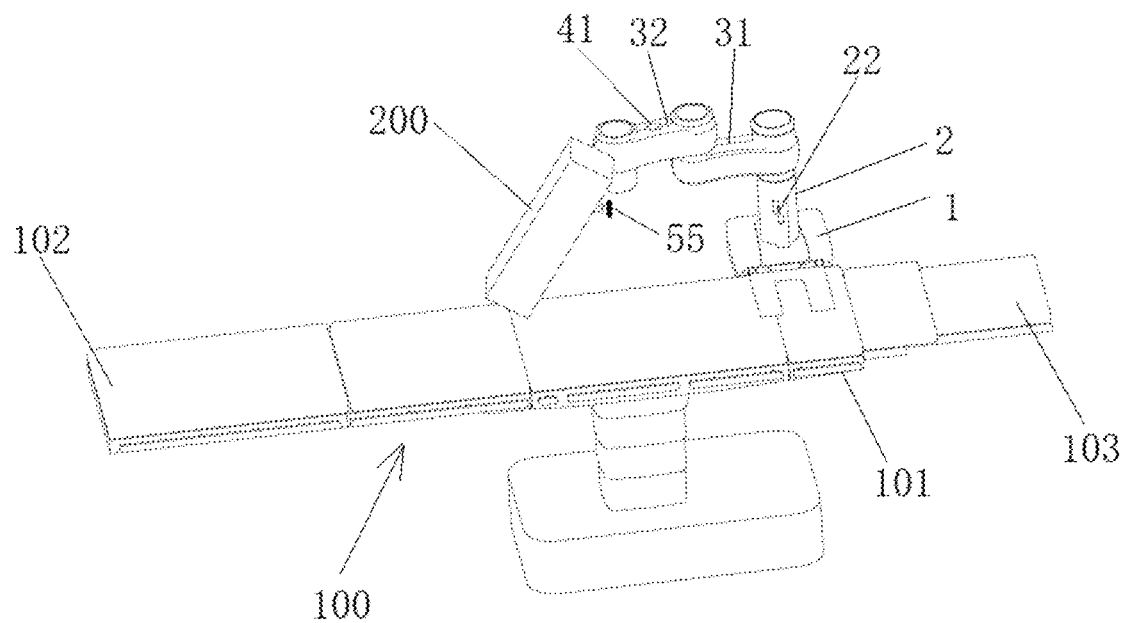
FIG. 8 is a schematic diagram of the auxiliary support apparatus according to an embodiment of the present disclosure, connected to the surgical bed, where the surgical instrument is in an inclined attitude.

As shown in FIG. 1, by pivoting the first arm rod 31, the second arm rod 32 and the third arm rod 33, the surgical instrument 200 can be moved to the head end 102 of the surgical bed 100. As shown in FIG. 4, by pivoting the first arm rod 31, the second arm rod 32 and the third arm rod 33, the angle between the arm rod and the base 1, and the angles between adjacent arm rods, the surgical instrument 200 can also be moved to the tail end 103 of the surgical bed 100.

During surgery, since different procedures may require different angles for the surgical instrument 200 to enter the human body, in order to meet these varying angular requirements, the auxiliary support apparatus further includes an installation mechanism 5 provided at the distal end of the support arm 3 opposite the base 1 and configured to install the surgical instrument 200, where the installation mechanism 5 is pivotably connected to the support arm 3, The installation mechanism 5 can drive the surgical instrument 200 to rotate 360° relative to the support arm 3, thereby meeting the varying angular requirements for the surgical instrument 200 to enter the human body.

As shown in FIGS. 5 to 8, the installation mechanism 5 includes a rotation assembly and an installation member 54. The rotation assembly is provided at a distal end of the support arm 3 opposite the base 1 and is connected to the installation member 54, thus can drive the installation member 54 to rotate. The installation member 54 is configured to install the surgical instrument 200. The installation member 54 is driven to rotate by the rotation assembly, and in turn drives the surgical instrument 200 to rotate. The installation member 54 may be an installation plate, an installation flange or any other component that facilitates connection to the surgical instrument 200. The surgical instrument 200 is detachably connected to the installation member 54 via bolt connection or snap-fit connection.

Specifically, the rotation assembly includes a worm gear 52 and a worm 53. The installation member 54 is centrally connected to the worm gear 52. The worm gear 52 and the worm 53 are meshed for transmission. The rotation of the worm 53 can drive the installation member 54 to rotate through the worm gear 52. The installation member 54 is centrally connected to the worm gear 52 through a connecting shaft. The rotation of the worm 53 can drive the worm gear 52 to rotate, which in turn drives the installation member 54 to rotate, causing the installation member 54 to drive the surgical instrument 200 to rotate, thereby adjusting the angle for the surgical instrument 200 to enter the human body.

Of course, in other embodiments, the rotation assembly may also include a gear and a rack, where the rack engages with the gear for transmission, and the installation member 54 is centrally connected to the gear. Moving the rack can drive the gear to rotate, which in turn drives the installation member 54 to rotate, thereby driving the surgical instrument 200 to rotate.

Further, the installation mechanism 5 also includes an installation housing 51 fixed to the distal end of the support arm 3 opposite the base 1, where the worm gear 52 is arranged in the installation housing 51, and the worm 53 has one end engaged with the worm gear 52 for transmission and the other end extending outwardly from the installation housing 51, and is rotatably connected to the installation housing 51. Since the rotation assembly is installed in the installation housing 51, the installation housing 51 can protect the rotation assembly from damage while ensuring aesthetics. Since the other end of the worm 53 extends outwardly from the installation housing 51, the worm 53 is easy to be manually rotated, and the worm gear 52 can be driven to rotate by rotating the worm 53.

In order to facilitate the operation of medical staff, a rotary handle 55 is provided at the extended end of the worm 53. The worm 53 is rotated by rotating the handle 55, which in turn rotates the installation member 54 to adjust the attitude of the surgical instrument 200.

When in use, the auxiliary support apparatus is fixed on the surgical bed 100 to support the surgical instrument 200. The base 1 is provided with a fixation assembly 11 configured to fix the auxiliary support apparatus to the surgical bed 100. Specifically, the fixation assembly 11 includes a first fixation member and a second fixation member. The first fixation member is configured to mate with a lateral side of the surgical bed 100 and height-adjustable relative to the base 1 for accommodating surgical beds 100 of different heights. The second fixation member is configured to mate with a bed surface of the surgical bed 100, for supporting the auxiliary support apparatus by the bed surface of the surgical bed 100. Since the auxiliary support apparatus is detachably connected to the surgical bed 100 via the fixation assembly 11 with the first fixation member being height-adjustable relative to the base 1 according to the height of the surgical bed 100, the versatility is improved, accommodating surgical beds 100 of various heights for installation. In addition, the auxiliary support apparatus can be removed from the surgical bed 100 when necessary, freeing up more space for different surgical procedures.

Figure 9:
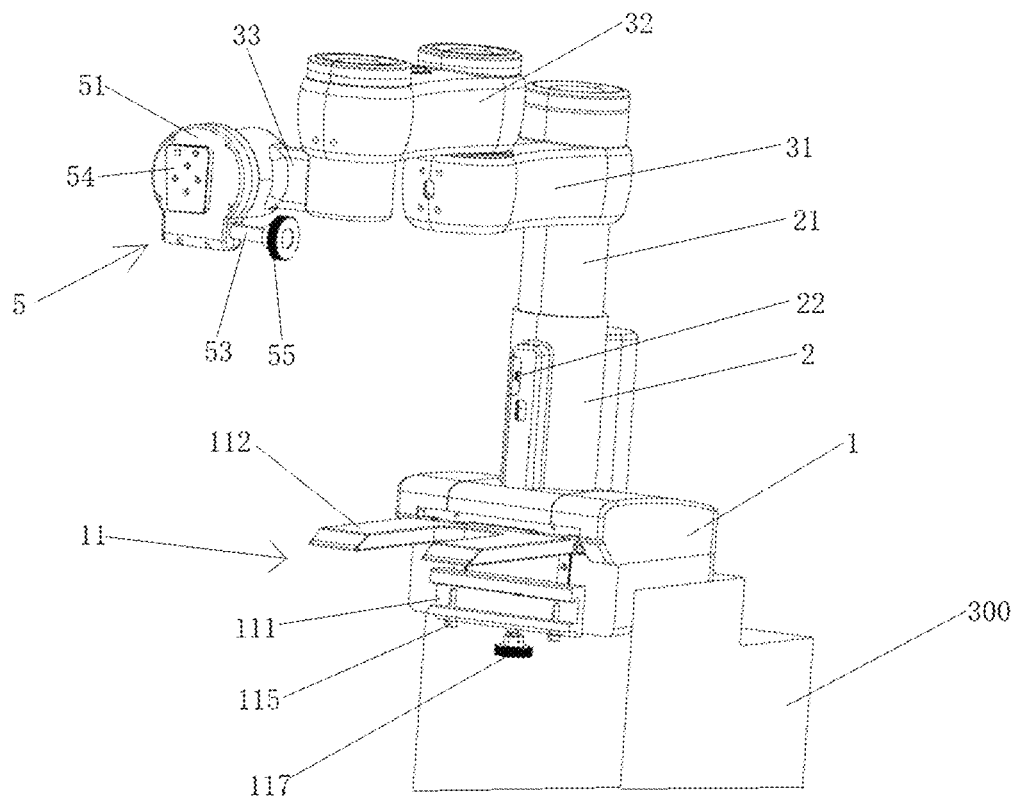
FIG. 9 is a schematic structural diagram of the first alternative of fixation assembly of the auxiliary support apparatus according to an embodiment of the present disclosure.
Figure 10:
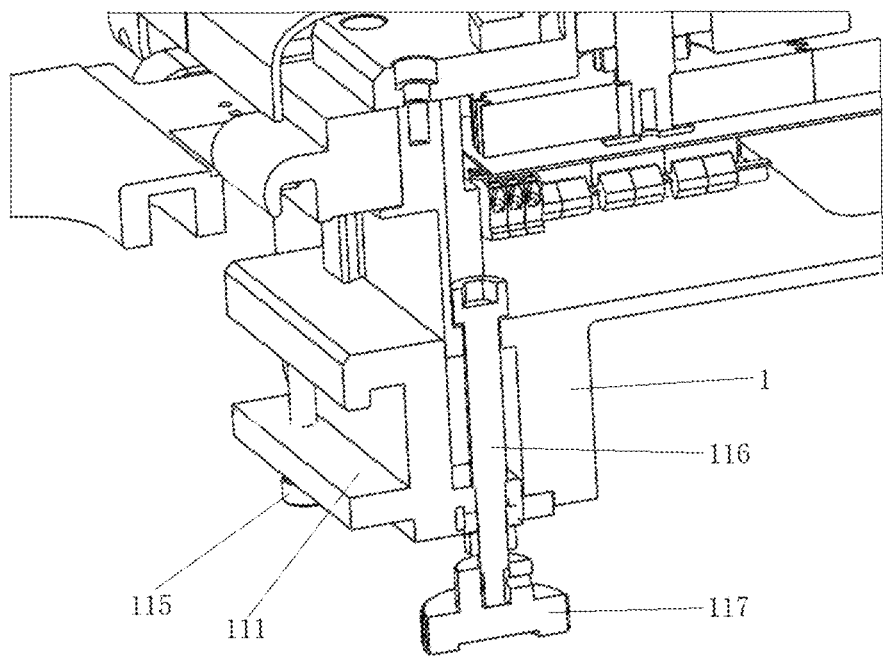
FIG. 10 is a cross-sectional view of the first alternative of fixation assembly of the auxiliary support apparatus according to an embodiment of the present disclosure, where the installation groove is in a lower position.
Figure 11:
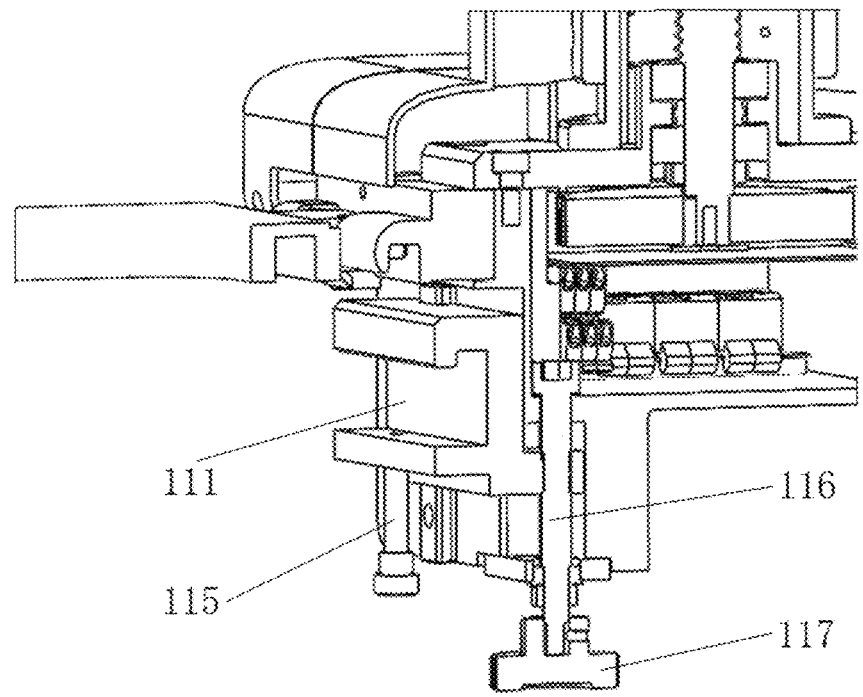
FIG. 11 is a cross-sectional view of the first alternative of fixation assembly of the auxiliary support apparatus according to an embodiment of the present disclosure, where the installation groove is in a higher position.

For supporting a lightweight surgical instrument 200, as shown in FIGS. 9-11, the first alternative of fixation assembly 11 according to this embodiment includes an installation groove 111 and a support seat 112. The installation groove 111 is provided below the support seat 112 and configured to mate with the steel rail 101 on one side of the surgical bed 100, and the support seat 112 is configured to be placed on the bed surface of the surgical bed 100 to support the auxiliary supporting device. The installation groove 111 is height-adjustable relative to the base 1. Since the installation groove 111 mates with the steel rail 101 on the side of the surgical bed 100 proximate to the base 1, and is fixed to the steel rail 101 by fastening screws 115 from one side of the installation groove 111 through the side wall of the installation groove 111, thereby accommodating steel rails 101 of different widths for connection. The support seat 112 abuts against the bed surface of the surgical bed 100 to bear the weight of the auxiliary supporting device. Since the lightweight surgical instrument 200 is installed on a single side of the surgical bed 100, the area of the surgical bed 100 occupied is reduced.

Specifically, the base 1 is also provided with a height adjustment stud 116. A threaded hole is provided on the side of the installation groove 111 opposite the groove opening, and two limiting holes are provided to be spaced apart along the height direction of the base 1, where the threaded hole is provided between the two limiting holes and coaxial with them. The height adjustment stud 116 passes through one limiting hole, the threaded hole and the other limiting hole in sequence and is connected to the limiting nut 117, so that the height adjustment stud 116 is rotatably engaged with the two limiting holes, allowing the height adjustment stud 116 to drive the installation groove 111 to move up and down along the height direction through its rotation driven by the limiting nut 117, thereby adjusting the installation groove 111 to mate with the steel rail 101 on the surgical bed 100 of different heights.

Of course, in other embodiments, a slide groove extending along the height direction may also be provided on the base 1, and a slider for mating with the slide groove is provided on the side of the installation groove 111 opposite the groove opening. The height of the installation groove 111 on the base 1 is adjusted as the slider slides in the slide groove, and the slider is fixed in the slide groove by a fixation member such as a screw after the height is adjusted as desired.

Figure 12:
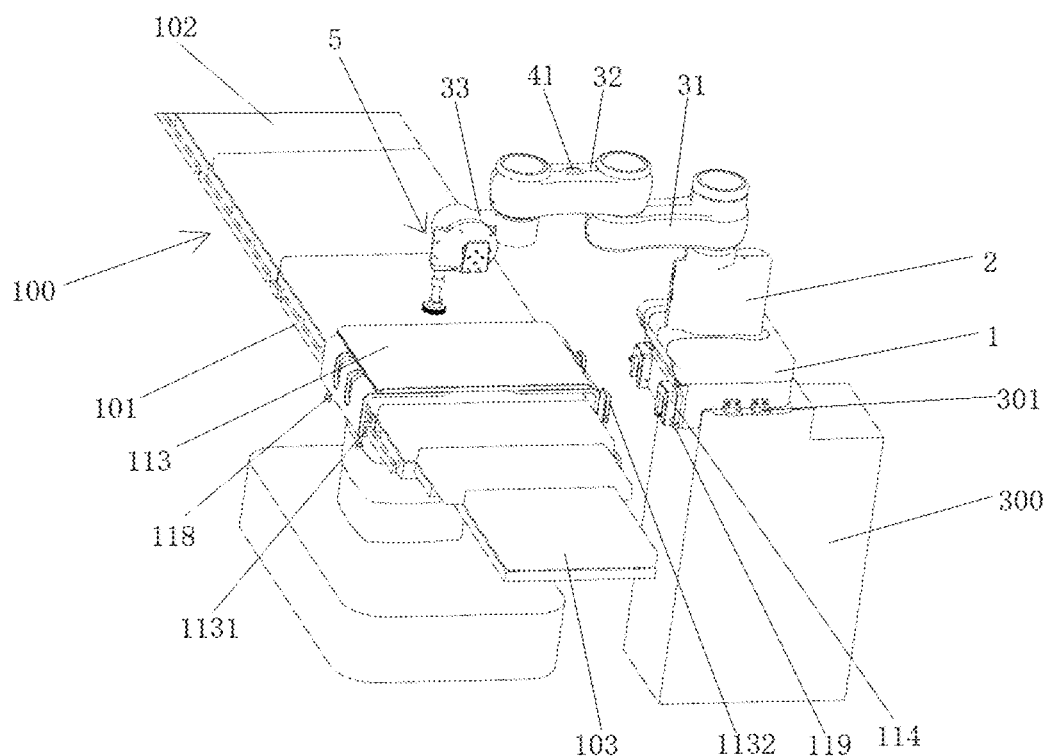
FIG. 12 is a schematic structural diagram of the second alternative of fixation assembly of the auxiliary support apparatus according to an embodiment of the present disclosure.
Figure 13:
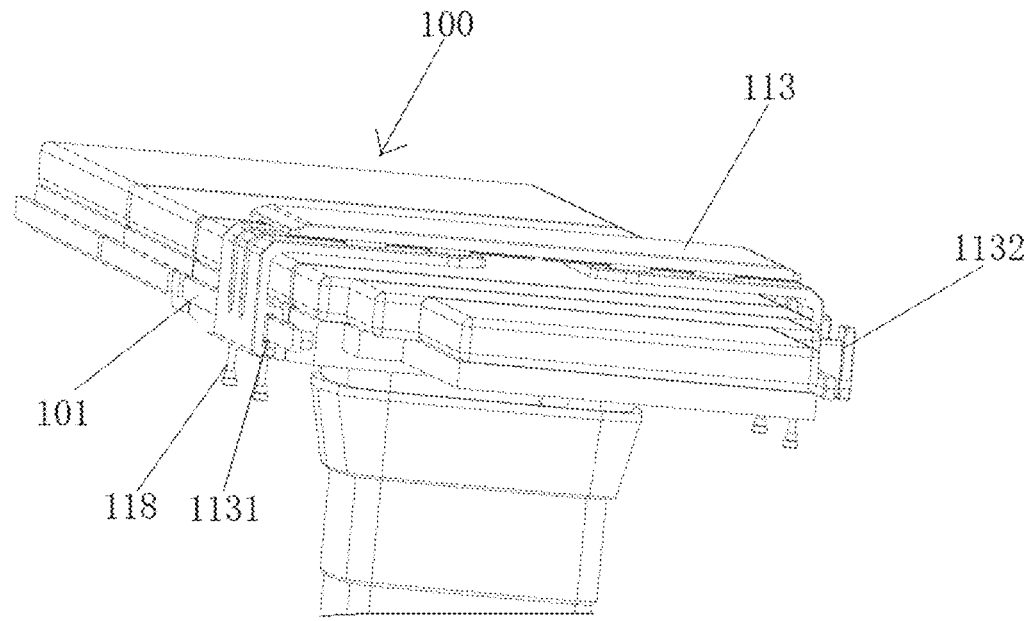
FIG. 13 is a schematic structural diagram of the second alternative of fixation assembly of the auxiliary support apparatus according to an embodiment of the present disclosure, where the installation bracket is mated with the surgical bed.

For the auxiliary support apparatus for supporting a heavy surgical instrument 200, as shown in FIG. 12 and FIG. 13, the second fixation assembly 11 according to this embodiment includes an installation bracket 113 and a fixation slot 114, where the installation bracket 113 is configured to span across the bed surface of the surgical bed 100 and laterally mate with the steel rails 101 on both sides of the surgical bed 100. The installation bracket 113 is provided with an installation lug 1132 on one side proximate to the base 1 for mating with the fixation slot 114 height-adjustable relative to the base 1. The installation bracket 113 is provided in an inverted U-shaped structure, with clamping slots 1131 for mating with the steel rails 101 being provided inside both side walls respectively. The two steel rails 101 on both sides of the surgical bed 100 respectively placed in the two clamping slots 1131 are clamped onto the clamping slot 1131 or secured thereto by the first locking screw 118. The U-shaped installation bracket 113 is provided with the installation lug 1132 outside one side wall proximate to the base 1. Two installation lugs 1132 and two fixation slots 114 are provided. The two installation lugs 1132 are fixedly plugged to the two fixation slots 114 in one-to-one correspondence or are locked to be secured via the second locking screw 119 after being plugged. The two fixation slots 114 are also provided to be height-adjustable. The height adjustment mechanism for the fixation slots 114 is the same as that for the above-mentioned installation groove 111, which will not be repeated here. This configuration can ensure the stability of the heavy surgical instrument 200 supported on the surgical bed 100.

Figure 14:
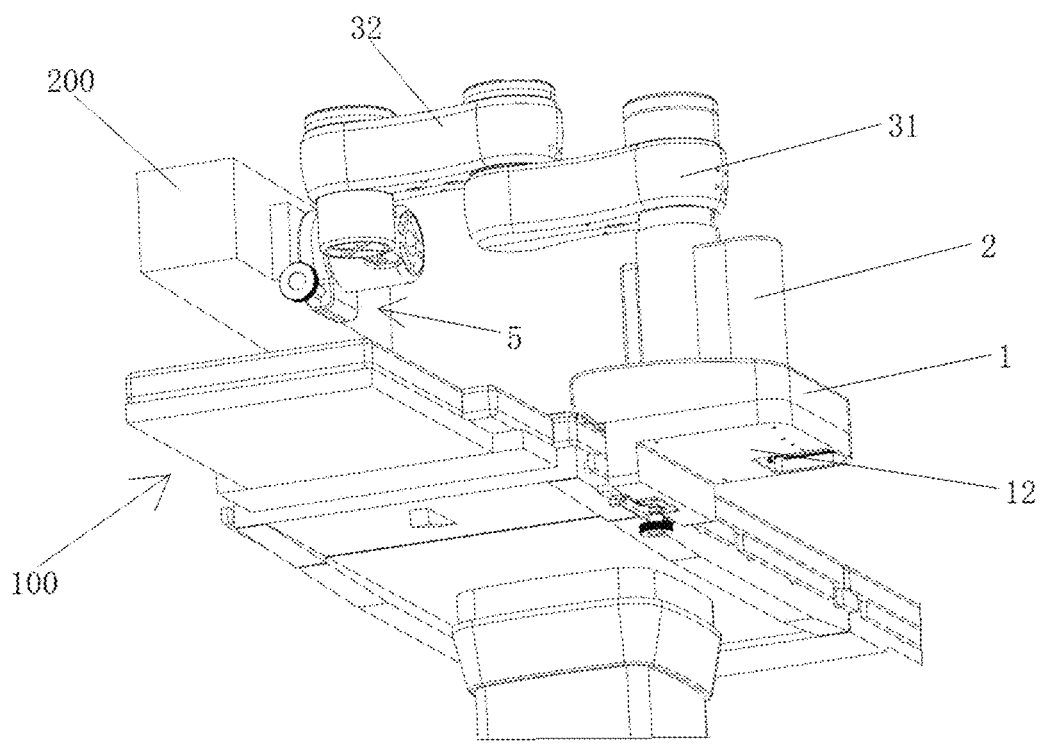
FIG. 14 is a schematic structural diagram of the transport coupling interface at the base of the auxiliary support apparatus according to an embodiment of the present disclosure.
Figure 15:
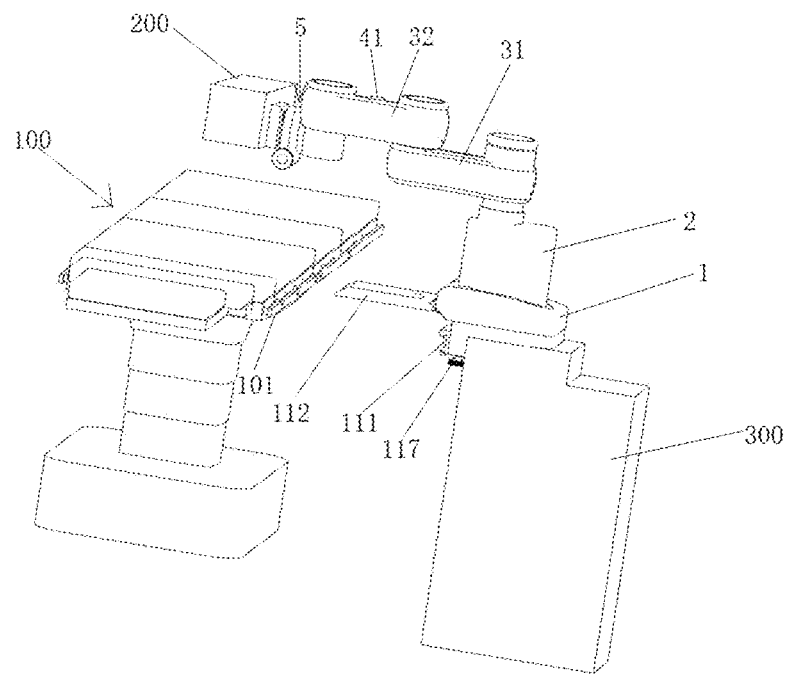
FIG. 15 is a schematic diagram of the auxiliary support apparatus according to an embodiment of the present disclosure when it is transferred from the transfer trolley to the surgical bed.
Figure 16:
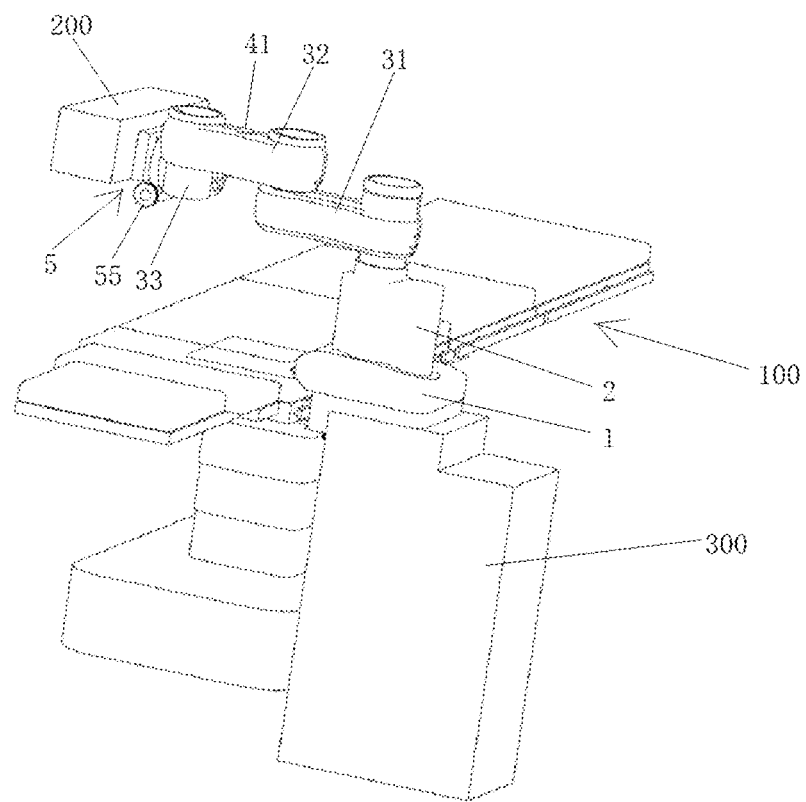
FIG. 16 is a schematic structural diagram of the auxiliary support apparatus according to an embodiment of the present disclosure when it is transferred from the transfer trolley to the surgical bed and connected to the surgical bed.

Further, as shown in FIGS. 14-16, a transport coupling interface 12 is provided at the bottom of the base 1. The transport coupling interface 12 is L-shaped and is configured to mate with the transfer trolley 300. The L-shaped transport coupling interface 12 mates with the top surface and a side surface adjacent thereto of the transfer trolley 300. A connector 301 is also provided on the top surface of the transfer trolley 300, and configured to fixedly connect both sides of the base 1 to the top surface. In this embodiment, the connector 301 includes an L-shaped connecting plate and a screw, where the long arm of the L-shaped connecting plate is fixedly connected to the top surface, and the short arm is fixedly connected to the side wall of the base 1 by the screw. The attachment of the base 1 onto the transfer trolley 300 in such a mated manner facilitates the installation of the auxiliary support apparatus onto the surgical bed 100, its removal from the surgical bed 100 and its transportation, thereby enhancing the flexibility in mating the auxiliary support apparatus with the surgical bed 100.

The auxiliary support apparatus according to this embodiment can be transported to the vicinity of the surgical bed 100 by the transfer trolley 300 and installed onto the surgical bed 100. and then the surgical instrument 200 can be installed onto the installation member 54. The height of the support arm 3 relative to the surgical bed 100 can be adjusted by the lifting button 22 on the support sleeve 2 to adjust the height of the surgical instrument 200 relative to the surgical bed 100. Pressing the brake button 41 disengages the electromagnetic brake 43 from the pivot shaft 42, enabling adjustment of the relative angles of the arm rods in the end-to-end stacked configuration, thereby allowing the surgical instrument 200 to be positioned to be adapted to different positions of the surgical bed 100 for accommodating different surgical procedures and patients of different heights. After the surgical instrument 200 is adjusted in place, repressing the brake button 41 causes the electromagnetic brake 43 to engage with the pivot shaft 42 to secure the position of each arm rod, thereby ensuring the positional stability of the surgical instrument 200 and thus guaranteeing the smooth progression of surgical procedures. In order to accommodate different angles for the surgical instrument 200 to enter the human body, an installation mechanism 5 is provided at distal end of the support arm 3 opposite the base 1 with the installation member 54 for installation of the surgical instrument 200 being centrally fixed to the worm gear 52 engaged with the worm 53. The rotation of the worm 53 can drive the installation member 54 to rotate through the worm gear 52. The installation member 54 is centrally connected to the worm gear 52 through a connecting shaft. The rotation of the worm 53 can drive the worm gear 52 to rotate, which in turn drives the installation member 54 to rotate, causing the installation member 54 to drive the surgical instrument 200 to rotate, thereby adjusting the angle for the surgical instrument 200 to enter the human body. For light surgical instruments 200, a fixation assembly 11 is configured to be fixed to one side of the surgical bed 100 for connection to the auxiliary support apparatus, thereby reducing the area of the surgical bed 100 occupied. For heavy surgical instruments 200, an installation bracket 113 configured to be fixed to both sides of the surgical bed 100 and a fixation slot 114 on the base 1 are provided to mate with each other, thereby ensuring the support stability for the heavy surgical instrument 200. In addition, a transfer trolley 300 is provided for mating with the base 1, facilitating easy installation and removal of the auxiliary support apparatus, thereby enhancing its flexibility.

The above content is only a preferred embodiment of the present disclosure. For ordinary technicians in this field, according to the idea of the present disclosure, there will be changes in the specific implementation method and application scope. The content of this specification should not be understood as a limitation of the present disclosure.

What is claimed is:
1. An auxiliary support apparatus, comprising:
a base;
a support arm vertically movably provided on the base and pivotable relative to the base, the support arm comprising at least two arm rods pivotably connected in an end-to-end stacked configuration, and having a distal end, opposite the base, for detachable connection to a surgical instrument; and
a pivot mechanism comprising a brake button, pivot shafts and electromagnetic brakes, the pivot shafts being configured for respective connections between one of at least two arm rods and the base and between adjacent arm rods, and the electromagnetic brakes being provided to correspond to the pivot shafts respectively and electrically connected to the brake button.

2. The auxiliary support apparatus according to claim 1, further comprising an installation mechanism provided at the distal end of the support arm and pivotably connected to the support arm.

3. The auxiliary support apparatus according to claim 2, wherein the installation mechanism comprises a rotation assembly and an installation member, the rotation assembly being provided at the distal end of the support arm and connected to the installation member.

4. The auxiliary support apparatus according to claim 3, wherein the rotation assembly comprises a worm gear and a worm, the installation member being centrally connected to the worm gear, and the worm gear being engaged with the worm for transmission.

5. The auxiliary support apparatus according to claim 4, wherein the installation mechanism further comprises an installation housing fixed to the distal end of the support arm, the worm gear being disposed within the installation housing, and the worm having one end engaged with the worm gear for transmission and the other end extending outwardly from the installation housing, wherein the worm is rotatably connected to the installation housing.

6. The auxiliary support apparatus according to claim 5, wherein a rotary handle is provided at the other end of the worm that extends outwardly.

7. The auxiliary support apparatus according to claim 3, wherein the rotation assembly includes a gear and a rack, the rack being engaged with the gear for transmission, and the installation member being centrally connected to the gear.

8. The auxiliary support apparatus according to claim 1, wherein the base is provided with a fixation assembly comprising a first fixation member and a second fixation member, the first fixation member being configured to mate with a lateral side of a surgical bed and height-adjustable relative to the base, and the second fixation member being configured to mate with a bed surface of the surgical bed.

9. The auxiliary support apparatus according to claim 1, wherein the base is provided with a fixation assembly comprising an installation groove and a support seat, the installation groove being provided below the support seat and configured to mate with a steel rail on one side of a surgical bed, and the support seat being configured to be supported on a bed surface of the surgical bed, wherein the installation groove is height-adjustable relative to the base.

10. The auxiliary support apparatus according to claim 9, wherein the installation groove is secured via a fastening screw to the steel rail mated with the installation groove.

11. The auxiliary support apparatus according to claim 9, wherein the installation groove is formed on a movable member in the fixation assembly, and the base is further provided with a height adjustment stud that is rotatably fixed to the base and is threadedly engaged with a threaded hole provided in the movable member.

12. The auxiliary support apparatus according to claim 11, wherein the threaded hole is provided on a side of the movable member opposite the installation groove, and the base is further provided with two limiting holes for limiting the height adjustment stud extending therethrough, wherein threaded hole is coaxially located between the two limiting holes.

13. The auxiliary support apparatus according to claim 11, wherein a limiting nut is fixedly connected to the height adjustment stud for driving rotation of the height adjustment stud.

14. The auxiliary support apparatus according to claim 9, wherein the base is further provided with a slide groove extending along a height direction of the installation groove, and the installation groove is formed on a movable member in the fixation assembly, with a slider being provided on a side of the movable member opposite the installation groove and slidably mated with the slide groove.

15. The auxiliary support apparatus according to claim 1, wherein the base is provided with a fixation assembly comprising an installation bracket and a fixation slot, the installation bracket being configured to span across a bed surface of a surgical bed and be laterally engaged with steel rails on both sides of the surgical bed and comprising on one side proximate to the base an installation lug for mating with the fixation slot, and the fixation slot being height-adjustable relative to the base.

16. The auxiliary support apparatus according to claim 15, wherein the installation bracket has an inverted U-shaped structure, with clamping slots provided on inner sides of both side walls for mating with the steel rails respectively.

17. The auxiliary support apparatus according to claim 1, wherein a transport coupling interface is provided at a bottom of the base and is L-shaped.

18. The auxiliary support apparatus according to claim 17, wherein the transport coupling interface is configured to mate with a transfer trolley comprising a connector configured for fixed connection to the base.

* * * * *